Aug. 13, 1940.                    E. LINKS                        2,211,238
                              LIGHT FILTER
                         Filed April 28, 1938
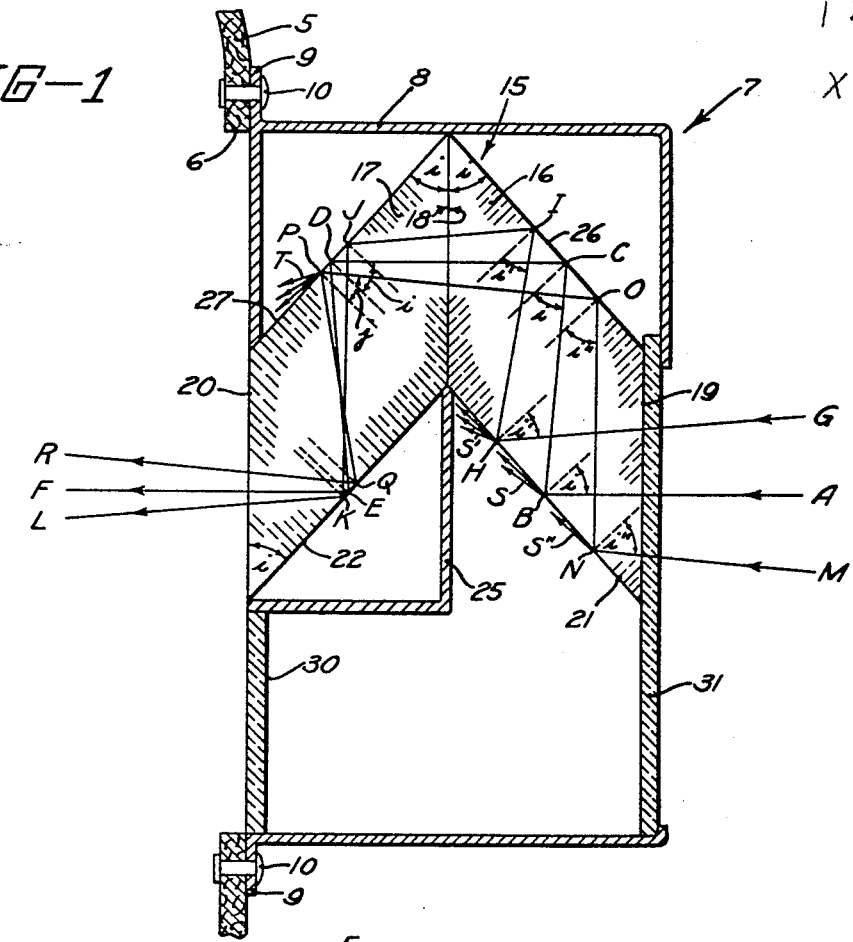
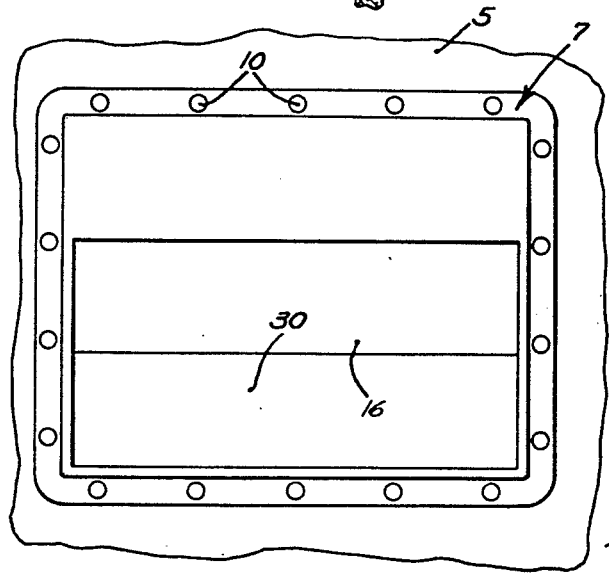
INVENTOR.
ERRETT LINKS Patented Aug. 13, 1940

2,211,238

UNITED STATES PATENT OFFICE 2,211,238

LIGHT FILTER

Errett Links, Moline, Ill.

Application April 28, 1938, Serial No. 204,800

1 Claim. (Cl. 88—1)

The present invention relates generally to light filters and more particularly to a light filter for use in eye protectors of the type commonly used in electric and acetylene welding operations, to protect the operator's eyes from the injurious rays in the light from the arc or flame.

The conventional welding hoods, in general use at the present time, are provided with a light filter consisting of a window of cobalt glass which absorbs most of the light rays from the arc and permits only a small band of rays in the spectrum to pass therethrough. While a cobalt glass filter is satisfactory for observing the arc during the welding operation, it is substantially opaque to all visible light of ordinary intensity and therefore it is necessary to remove the hood during the time that the operator is arranging and adjusting the parts which are to be welded. When each welding operation is of comparatively short duration, the time required for removing and replacing the welding hood amounts to an appreciable portion of the total time for the welding operation and thereby reduces considerably the welder's efficiency.

Welding hoods have been devised which are so mounted on the operator's head that they can be swung upwardly and held in this position by means of an electrically controlled latch while the operator arranges his work. When the succeeding welding operation is begun by striking the arc, an electric circuit is completed which releases the latch and allows the hood to drop into position before the operator's eyes. With this type of hood, however, there is a short instant before the hood falls, in which the operator's eyes are subjected to the harmful rays of light from the arc and if this is repeated many times a day, the accumulative effect of these instances is apt to result in serious consequences. However, it is difficult for a welder to strike the arc in the proper place with the welding hood before his eyes, for until the arc is struck, there is practically no light transmitted through the cobalt glass window.

The principal object of my invention, therefore, relates to the provision of a light filter which intercepts the harmful rays of light, but transmits sufficient harmless visible light so that the operator can see to arrange his work and to strike the arc, without the necessity of removing his hood. It has been found that the rays of light which are injurious to the human eye are the ultra violet rays of wave lengths between .0136 and .400 micron, and the infra-red rays having wave lengths greater than .800 micron. The ultra violet rays, however, present no problem, for they are effectively absorbed by a pane of ordinary window glass and, therefore, it is the rays of long wave length with which my invention is concerned.

It is therefore a further object of my invention to provide an eye protector having means for filtering or separating out the rays of light having wave lengths greater than a pre-determined maximum value. In the accomplishment of these objects, advantage is taken of the phenomenon that when light passes from a dense substance to a less dense substance, it is bent or refracted away from a line perpendicular to the surface of the substance. The amount of refraction is expressed by the index of refraction which is decreasingly less with a given substance for light of increasing wave length, and is slightly different for different kinds of glass. When the angle of incidence of the light against the surface is zero degrees, the rays of light pass through the surface perpendicular thereto and there is no bending of the rays leaving the surface. As the angle of incidence increases, the angle of refraction increases at a greater rate and therefore there is a critical angle at which the angle of refraction is 90 degrees, and further increase in the angle of incidence results in the light rays being internally reflected within the prism from the surface. Since light rays of long wave lengths are refracted to a smaller angle than rays of short wave lengths, there is a small range of variation of the angle of incidence at which rays of shorter wave lengths are internally reflected within the prism, while those of longer wave lengths are refracted at the surface of the prism, and since the angle of reflection is equal to the angle of incidence, there is a wide separation between the reflected rays and the refracted rays. It is thus possible to adjust the position of a prism relative to the rays of light from the arc or flame at such an angle that light rays having wave lengths greater than any desired predetermined value, are refracted, while those having wave lengths less than that pre-determined value are reflected internally. The problem would be comparatively simple if the light source and the filter prism were fixed relative to each other so that the angle of incidence of the rays against the surface of the prism could be once adjusted and maintained at a constant value. Obviously, however, this is not the case, for the arc or flame moves along as the work progresses and the position of the light filter changes as the operator moves his head.

Another object of my invention, therefore, is concerned with the provision of an eye protector having filter means of the class described, which is adapted to filter out all rays received by it, having wave lengths greater than a pre-determined maximum value independent of the relative positions of the flame and the filter, and transmitting to the eye only the waves having lengths less than the pre-determined value, regardless of the movement of the welder.

Since a light filter of the prism type disclosed herein merely filters out the harmful rays and allows the remainder to be transmitted to the eye in substantially full intensity, it would be unsuitable for continued use during the welding operation, due to the fact that the light from the arc would still be discomforting to the eyes even though all the injurious rays were removed. Furthermore, due to the brightness of the light, the eye could not distinguish the flow of the welding metal, and therefore it is still another object of the present invention to provide a combination filter device having one window for observing the work during adjustment and the striking of the arc, and another window for the continued observation of the welding operation in which the intensity of the light is greatly reduced.

These and other objects will be made apparent by consideration of the following description, reference being had to the appended drawing in which Figure 1 is a sectional elevation drawn to an enlarged scale, of a light filter embodying the principles of this invention as applied to a welding hood, the latter being shown fragmentarily; and Figure 2 is a front elevation of the device shown in Figure 1, but drawn to a smaller scale.

Referring now to the drawing, reference numeral 5 indicates the fragments of the welding hood, which may be of any suitable design. The hood 5 is provided with an opening 6 over which is mounted the filter device indicated generally by the reference numeral 7 and comprising a casing 8 provided with an outwardly turned flange 9, which is secured to the hood 6 by means of rivets 10 or any other suitable securing means. Within the casing 8 is disposed an inverted V-shaped prism structure 15 which is preferably constructed of a pair of rhombohedral prisms 16, 17 disposed with their ends 18 in juxtaposition and preferably secured together by suitable transparent cementing means. The opposite ends 19, 20 of the prisms are disposed parallel to the adjacent ends 18 and form surfaces through which the light rays enter and leave the prism, respectively.

The normal path of light is indicated by the line designated ABCDEF. The light enters the prism perpendicular to the end surface 19 and falls upon the side surface 21, which, with the opposite side surface 22 of the other prism 17, form inner converging walls of the V-shaped prism structure. The surface 21 is so disposed that the angle of incidence $i$ is a critical angle at which most of the rays are reflected internally within the prism along the line B—C but all of the rays having a wave length greater than a pre-determined maximum value, are transmitted through the surface 21 and are refracted in the direction indicated by the arrows S. This angle $i$ can be made any suitable value to divide the light rays at any desired wave length, for the particular kind of glass or quartz used in the prism. For example, assume that for one type of glass the angle of incidence of 42° 30′ is the critical angle for yellow light of wave length 0.550 micron, which is well within the range of harmless rays and is the value which is used in the illustrated embodiment. Thus part of the yellow rays, as well as the orange, red, and infra-red rays are refracted as indicated by the arrows S and are absorbed by an opaque wall or partition 25 which prevents them from reaching the eye of the observer.

The remainder of the rays, that is, those rays having a wave length less than 0.550 micron, fall upon the surface 26, which is parallel to the surface 21, at the critical angle of incidence $i$ since the rays reflect from the latter surface at an angle equal to the angle of incidence $i$. The rays are then reflected from the surface 26 along the line C—D to the surface 27 which converges with the surface 26 to form the outer sides of the inverted V-shaped prism structure. Hence the rays pass across the apex of the prism structure to the surface 27, upon which they fall at the critical angle $i$ and are again internally reflected along the line D—E to the surface 22, from which they are once more reflected and pass out through the end 20 of the prism 17 along the line E—F. Thus it can be readily seen that normally the harmful rays are divided from the light beam at the surface 21, after which the rays of short wave are reflected internally within the prism around the end of the absorbing wall 25 and thus are harmless when they reach the eye at the point F.

Considering now the effect produced when the operator inclines his head forwardly, whereby the light from the arc enters the filter along the line G—H. In this case it will be noted that the angle of incidence $i'$ is less than the normal angle of incidence $i$, thereby resulting in more of the light rays being refracted from the prism surface 21 as indicated by the arrows S′. That is to say, a greater portion of the spectrum is refracted and absorbed by the partition 25 along with the infra-red rays, leaving a smaller portion to be reflected from the surface 21 to the surfaces 26, 27, and 22, successively, along the path indicated by the line HIJKL, than in the normal case in which the light rays strike the first prism surface 21 at the angle of incidence $i$. Thus it can be seen that the operator runs no risk of receiving light rays having wave lengths greater than the pre-determined maximum value by inclining his head forwardly to receive the rays at a smaller angle of incidence $i'$.

Now assume that the operator inclines his head back so that the light rays strike the surface 21 at an angle of incidence $i''$ which is greater than the normal angle of incidence $i$. In this case a smaller proportion of the light rays will be refracted from the surface 21 as indicated by the arrows S″, permitting a greater proportion of the rays of the spectrum to be reflected along the line N—O to the prism surface 26, and these reflected rays include rays having wave lengths greater than the pre-determined maximum value and which may therefore be injurious. The rays are reflected from the prism surface 26 along the line O—P across the apex of the prism structure and fall upon the opposite prism surface 27 at an angle of incidence $j$ which is less than the normal angle of incidence $i$. In Figure 1 it is clearly evident that the greater the angle of incidence of the rays against the first prism surface 21, the smaller will be the angle of incidence against the third prism surface 27, so that any injurious rays which are reflected from the first prism surface 21, will be refracted from the third prism surface 27, as indicated by the arrows T and are absorbed by the opaque walls of the casing 8. Since the angle of incidence $j$ at the third prism surface 27 is less than the normal angle of incidence $i$, not only the injurious rays having wave lengths greater than the pre-determined maximum value, will be intercepted from the light which continues along the path PQR, but also a portion of the rays having wave lengths less than the pre-determined maximum value. Therefore, whether the operator inclines his head forward or back from the normal position, he receives a smaller portion of the total light from the arc than when the light is received at the normal angle of incidence $i$, but in any case no rays are received by his eye having wave lengths greater than the pre-determined maximum value. Hence, in the example shown in the illustration, all rays having a wave length greater than .550 micron, are normally refracted at the surface 21 but if the angle of incidence of the light against this surface is less than normal, the maximum wave length of the reflected rays will be less than .550 micron due to more of the rays being refracted at the surface 21, while on the other hand, if the angle of incidence is greater than normal, the maximum wave length of the rays leaving the prism along the line QR is also less than .550 micron for the reason that the rays of longer length are refracted at the surface 27.

Although the prism 15 is adapted to filter out the rays of longer wave length, it does not appreciably diminish in intensity those rays which are transmitted through the prism and therefore the latter rays, while being non-injurious to the eye, are of such intensity that they are discomforting to the eye under extended observation. Furthermore, due to the high intensity of the transmitted light, the operator is unable to see clearly the flow of the welding metal. I have therefore provided in association with the prism, a second observation window 30 consisting of a conventional cobalt glass filter mounted in the casing 8 adjacent to the prism 15. The operator uses the window 30 for observation of the work during the actual welding operation at which time the cobalt glass filter is satisfactory for this purpose. The prism filter 15, therefore, is used during the time the operator is arranging his work preparatory to the welding operation and during the striking of the arc. Thus, there is no time lost by the operator in removing and replacing his hood, nor is there any danger to the operator's eyes resulting from the exposure to the harmful rays of the arc during the striking thereof.

A window 31 of ordinary glass is provided in front of the prism 15 and the cobalt glass 30, serving as a protection against spattering of molten metal against the more expensive parts of the filter and also serving to exclude dust and moisture from the surfaces of the prism which would result in impairing the operation thereof. The pane of glass 31 also serves to absorb all of the ultra-violet rays having wave lengths less than .400 micron.

I do not intend my invention to be limited to the details shown and described herein, except as set forth in the following claim.

I claim:

A light filter comprising a pair of rhombohedral prisms disposed with their ends in juxtaposition to form a V-shaped structure adapted to receive light through one end of one of said prisms generally perpendicular to the end surface thereof and impinging upon the side surface of said prism forming one of the inner converging walls of said V-shaped prism structure, said side surface being disposed at a critical angle to said end surface at which light rays entering the prism perpendicular to said end surface are divided at said side surface, all rays having wave lengths greater than a predetermined maximum value passing through and refracted from said side surface while those rays having shorter wave lengths are internally reflected to the outer surface of said prism, then reflected internally across the apex of said prism structure to the opposite outer surface, and then internally reflected successively to the adjacent inner surface of said structure and out through the end thereof opposite to said end through which said rays entered.

ERRETT LINKS.